US010255681B2

(12) United States Patent
Price et al.

(10) Patent No.: US 10,255,681 B2
(45) Date of Patent: Apr. 9, 2019

(54) IMAGE MATTING USING DEEP LEARNING

(71) Applicant: ADOBE SYSTEMS INCORPORATED, San Jose, CA (US)

(72) Inventors: Brian Lynn Price, San Jose, CA (US); Stephen Schiller, Oakland, CA (US); Scott Cohen, Sunnyvale, CA (US); Ning Xu, Urbana, IL (US)

(73) Assignee: Adobe Inc., San Jose, CA (US)

( * ) Notice: Subject to any disclaimer, the term of this patent is extended or adjusted under 35 U.S.C. 154(b) by 62 days.

(21) Appl. No.: 15/448,541

(22) Filed: Mar. 2, 2017

(65) Prior Publication Data

US 2018/0253865 A1   Sep. 6, 2018

(51) Int. Cl.
| G06K 9/36 | (2006.01) |
| G06K 9/46 | (2006.01) |
| G06N 3/08 | (2006.01) |
| G06T 7/90 | (2017.01) |
| G06T 7/194 | (2017.01) |

(52) U.S. Cl.
CPC ............ *G06T 7/194* (2017.01); *G06K 9/4604* (2013.01); *G06K 9/4652* (2013.01); *G06N 3/088* (2013.01); *G06T 7/90* (2017.01); *G06K 2009/366* (2013.01); *G06K 2009/4666* (2013.01); *G06T 2207/10024* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 8,175,384 B1 * | 5/2012 | Wang ................ G06T 7/194 |
| | | 348/586 |
| 2016/0057363 A1 * | 2/2016 | Posa ................ H04N 5/272 |
| | | 348/239 |
| 2017/0213112 A1 * | 7/2017 | Sachs ................ G06K 9/66 |

OTHER PUBLICATIONS

Juan O., Keriven R. (2005) Trimap Segmentation for Fast and User-Friendly Alpha Matting. In: Paragios N., Faugeras O., Chan T., Schnörr C. (eds) Variational, Geometric, and Level Set Methods in Computer Vision. VLSM 2005. Lecture Notes in Computer Science, vol. 3752. Springer, Berlin, Heidelberg.*
Li, Ping, Tingyan Duan, and Yongfeng Cao. "Image matting with normalized weight and semi-supervised learning." arXiv preprint arXiv:1710.10101 (Oct. 2017).*

(Continued)

*Primary Examiner* — Kim Y Vu
*Assistant Examiner* — Nathan J Bloom
(74) *Attorney, Agent, or Firm* — Shook, Hardy & Bacon, L.L.P.

(57) ABSTRACT

Methods and systems are provided for generating mattes for input images. A neural network system can be trained where the training includes training a first neural network that generates mattes for input images where the input images are synthetic composite images. Such a neural network system can further be trained where the training includes training a second neural network that generates refined mattes from the mattes produced by the first neural network. Such a trained neural network system can be used to input an image and trimap pair for which the trained system will output a matte. Such a matte can be used to extract an object from the input image. Upon extracting the object, a user can manipulate the object, for example, to composite the object onto a new background.

20 Claims, 8 Drawing Sheets

(56) References Cited

OTHER PUBLICATIONS

Shen X., Tao X., Gao H., Zhou C., Jia J. (Oct. 2016) Deep Automatic Portrait Matting. In: Leibe B., Matas J., Sebe N., Welling M. (eds) Computer Vision—ECCV 2016. Lecture Notes in Computer Science, vol. 9905. Springer, Cham.*
Yao GL. A survey on pre-processing in image matting. Journal of Computer Science and Technology 32(1): 122-138 Jan. 2017. DOI 10.1007/s11390-017-1709-z.*
Xu N, Price B, Cohen S, Huang T. Deep image matting. InComputer Vision and Pattern Recognition (CVPR) Mar. 10, 2017.*
Y. Zheng and C. Kambhamettu, "Learning based digital matting," 2009 IEEE 12th International Conference on Computer Vision, Kyoto, 2009, pp. 889-896. doi: 10.1109/ICCV.2009.5459326.*
Kim J, Han D, Tai YW, Kim J. Salient region detection via high-dimensional color transform and local spatial support. IEEE transactions on image processing. Jan. 2016;25(1):9-23.*
Levin, Anat, Dani Lischinski, and Yair Weiss. "A closed-form solution to natural image matting." IEEE Transactions on Pattern Analysis and Machine Intelligence 30.2 (2008): 228-242.*
E. Shahrian and D. Rajan, "Weighted color and texture sample selection for image matting," 2012 IEEE Conference on Computer Vision and Pattern Recognition, Providence, RI, 2012, pp. 718-725. doi: 10.1109/CVPR.2012.6247741.*
Cho D., Tai YW., Kweon I. (2016) Natural Image Matting Using Deep Convolutional Neural Networks. In: Leibe B., Matas J., Sebe N., Welling M. (eds) Computer Vision—ECCV 2016. ECCV 2016. Lecture Notes in Computer Science, vol. 9906.*
Jue Wang and Michael F. Cohen (2008), "Image and Video Matting: A Survey", Foundations and Trends® in Computer Graphics and Vision: vol. 3: No. 2, pp. 97-175. http://dx.doi.org/10.1561/0600000019.*
Shan Shen, W. Sandham, M. Granat and A. Sterr, "MRI fuzzy segmentation of brain tissue using neighborhood attraction with neural-network optimization," in IEEE Transactions on Information Technology in Biomedicine, vol. 9, No. 3, pp. 459-467, Sep. 2005. doi: 10.1109/TITB.2005.847500.*
Levin, A., Lischinski, D., & Weiss, Y. (2008). A closed-form solution to natural image matting. IEEE Transactions on Pattern Analysis and Machine Intelligence, 30(2), 228-242.
Chen, Q., Li, D., & Tang, C. K. (2013). KNN matting. IEEE transactions on pattern analysis and machine intelligence, 35(9), 2175-2188.
Wang, J., & Cohen, M. F. (Jun. 2007). Optimized color sampling for robust matting. In Computer Vision and Pattern Recognition, 2007. CVPR'07. IEEE Conference on (pp. 1-8). IEEE.
Gastal, E. S., & Oliveira, M. M. (May 2010). Shared Sampling for Real-Time Alpha Matting. In Computer Graphics Forum (vol. 29, No. 2, pp. 575-584). Blackwell Publishing Ltd.
Shahrian, E., Rajan, D., Price, B., & Cohen, S. (Jun. 2013). Improving image matting using comprehensive sampling sets. In Computer Vision and Pattern Recognition (CVPR), 2013 IEEE Conference on (pp. 636-643). IEEE.
Cho, D., Tai, Y. W., & Kweon, I. (Oct. 2016). Natural image matting using deep convolutional neural networks. In European Conference on Computer Vision (pp. 626-643). Springer, Cham.
Shen, X., Tao, X., Gao, H., Zhou, C., & Jia, J. (Oct. 2016). Deep automatic portrait matting. In European Conference on Computer Vision (pp. 92-107). Springer, Cham.

* cited by examiner

IMAGE MATTING USING DEEP LEARNING

BACKGROUND

Objects are oftentimes desired to be extracted from an image, for example, to combine the object with a different background. To facilitate removal of a foreground object, an image matte, or matte, can be used to extract the particular foreground object in the image. As a pixel color in an image may be the color of the foreground object, the color of the background, or some combination of foreground and background color, an image matte can include alpha values that indicate a percentage of foreground color that exists at each pixel. For example, a pixel may have a combination of foreground and background color when a camera pixel sensor receives light from both the foreground object and the background. Typically, pixels around the edge of objects and pixels in regions corresponding with hair, fur, and motion blur tend to have a combination of foreground and background color. Such alpha values can then be used to extract the foreground image from the background.

Because determining alpha values for each pixel can be time consuming, trimaps can be used to reduce the number of pixels for which an alpha value is determined. Generally, a trimap indicates regions of the image that are pure foreground, pure background, and unknown combinations of blended foreground and background colors. Accordingly, only alpha values in the regions of unknown color combinations may be determined.

While trimaps can reduce the number of alpha values to determine for an image, generating accurate alpha values in association with pixels can be difficult, particularly in instances in which the foreground object occupies only a portion of the pixel (e.g., a hair strand), a transparent object exists (e.g., glass or smoke), or an optical blur exists (e.g., object not in focus). Existing matting approaches used to separate foreground and background largely rely on colors to determine alpha values associated with pixels. For example, propagation based methods propagate the unknown region between known foreground and background regions using known foreground and background color values to fill-in the unknown region. As another example, sampling-based methods take color samples from known foreground and background regions and use the samples as candidates for the foreground/background colors at a pixel in an unknown region. Alternatively, methods exist that first use a sampling method and then feed the results into a propagation method. Some existing methods have utilized deep learning in association with estimating alpha values for generating mattes. One deep learning method used to predict alpha values utilizes results from the propagation-based method and normalized RGB colors. Another deep learning method trains a network to learn a trimap for an individual(s) in a portrait. The trimap can then be used in conjunction with the propagation-based method to predict alpha values.

As described, each of these existing methods rely primarily on color to determine alpha values. Because the existing methods rely on color, such methods fail to accurately determine alpha values when foreground and background colors and/or textures are similar to each other and have difficulty with edges, making images with fur or hair hard to segment. Thus, such methods are ineffective at producing accurate mattes for typical everyday scenes with similar foreground and background colors and/or textures.

SUMMARY

Embodiments of the present invention are directed towards a system trained to generate a matte of an image that accurately reflects the foreground/background relationship of pixels in the image. In accordance with embodiments of the present invention, such a system can be created using a neural network. In this regard, neural networks can be trained to assist in generating a matte for an image. The quality of a matte generated by a neural network system depends upon how the system is trained and what data it receives when training to produce the matte. To create a neural network system that generates accurate mattes, the system can be trained to differentiate between foreground and background in an image based on not only color but also structure and texture. Utilizing structure and texture in addition to color to train a neural network system can result in a more accurate matte.

Training to create such a neural network system can be accomplished by generating a training dataset including synthetic composite training images. Synthetic composite training images can be generated by compositing objects, extracted from high-contrast images using a matte, onto new backgrounds to create synthetic composite training images. Training image/reference matte pairs can be used to train a system to differentiate between foreground and background using color, shape, texture, and/or pattern to generate accurate mattes for input images. During training, errors are determined and used to adjust the system to avoid similar errors in future iterations. Upon completion of training, the neural network system can be used to generate accurate mattes for input images. Such a matte can then be used to correctly extract an object from an input image. The extracted object can be compiled with a new background to create a composite image.

DETAILED DESCRIPTION

Figure 1:
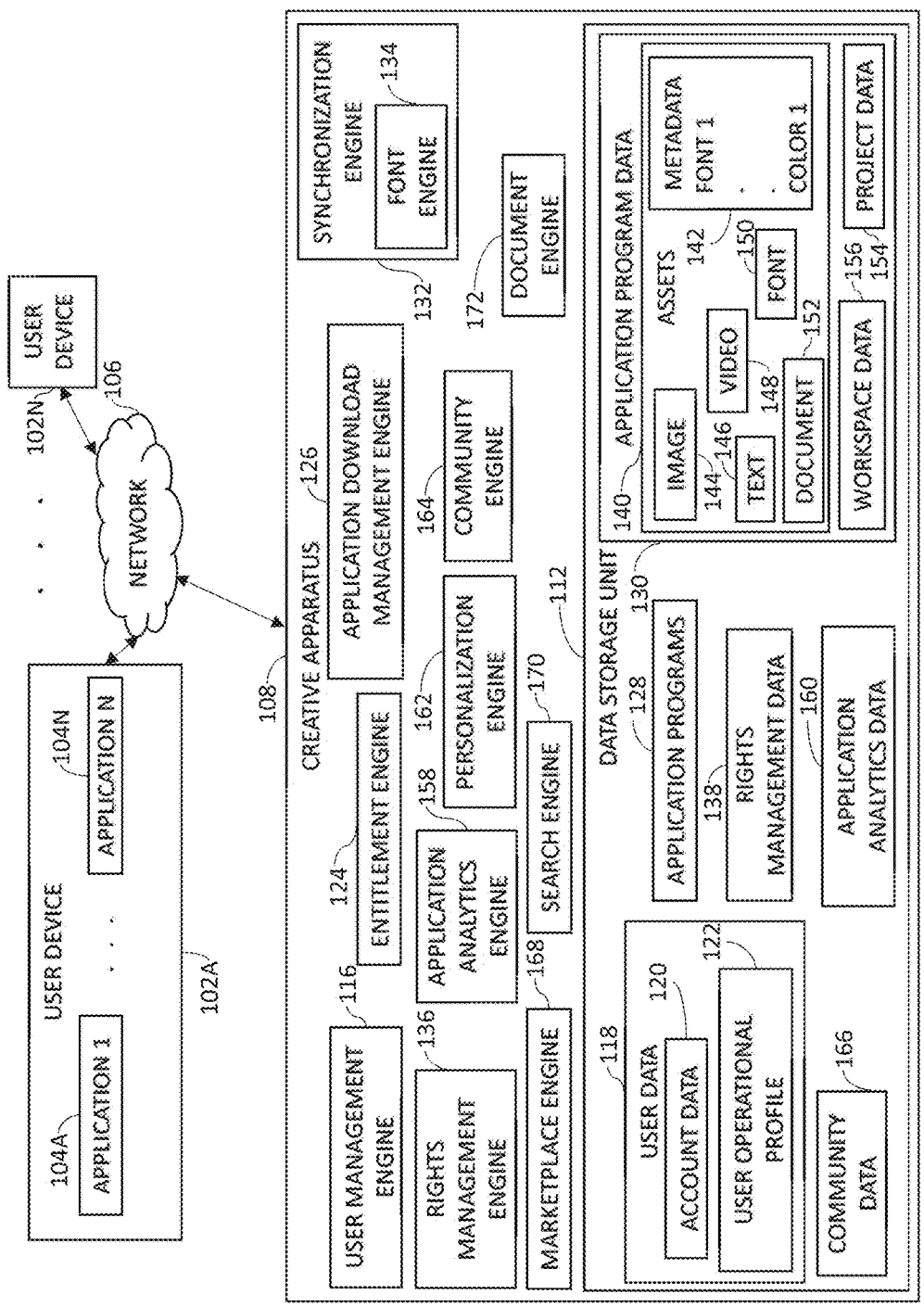
FIG. 1 depicts a diagram of an environment in which one or more embodiments of the present disclosure can be practiced, in accordance with various embodiments of the present disclosure.

Oftentimes, users desire to extract an object from an image. Upon extraction, the object can be used, for example, in combination with a new background to create a composite image. For example, such an extraction process allows a user to alter the background behind a person in a picture from a cityscape to a tropical beach. To extract an object from an image, a user can individually remove each pixel that comprises the background of the image. However, this process is time-consuming and tedious. Further, because edges of individual pixels often do not align with edges of the object, this manual process fails to take into account pixels that include both foreground and background information. This especially happens with details such as hair or fur as they can be thinner than an individual pixel.

To reduce the amount of time and effort spent removing an object from an image and to take into account pixels with both foreground and background information, matting can be used to perform object extraction. Matting is the process used to separate a foreground object from a background of an image. A matte (sometimes referred to as an alpha matte) generally includes alpha values that each indicate a percentage of foreground color that exists in association with the corresponding pixel. As such, in matting, an object, or foreground, is separated from a background in an image by categorizing each pixel of the image as foreground, background, or as containing both foreground and background information. Pixels containing both foreground and background information occur, for example, when physically on a camera sensor, some light is received from a background and some from a foreground object, and this information is blended into a singular pixel. This can occur, for instance, when objects are semi-transparent, for example, colored glass or a veil, or when there is blurring, either due to motion or optical blur.

Creating alpha values for the pixels in an image is a difficult task. This is because the matting equation generally used to solve for an alpha value for each pixel is an under-constrained equation, with more unknowns (e.g. seven) to solve given less known values (e.g. three). The matting equation can be expressed as $I_i = \alpha_i F_i + (1-\alpha_i) B_i$ $\alpha_i \in [0,1]$. In such an equation, the known values are the red, green, and blue (RGB) colors at pixel i, $I_i$. The unknown values include the RGB colors for foreground F, the RGB colors for background $B_i$, and alpha value estimation $\alpha_i$. The alpha value estimation generally refers to the percentage of the pixel that is comprised of foreground information.

To help constrain the area of an image where unknown color blend exists and alpha values need to be determined, a trimap can be used. A trimap marks regions of an image as pure foreground and/or pure background as well as indicates the unknown regions of the image for which the foreground/background percentages need to be determined. This unknown region of a trimap indicates an area for which pixels are likely a blend of foreground color and background color. Upon determining alpha values for the unknown regions of an image, a matte can depict, for example, pure foreground as a white pixel, pure background as a black pixel, and pixels comprised of both foreground and background as an appropriate shade of grey based on the percentage of foreground versus background.

Existing approaches generally implemented to create a matte for an image heavily rely on utilizing color to determine alpha values for pixels. That is, each of the propagation-based method, sampling-based method, and deep learning techniques described above rely on color to determine alpha values. Mattes for complex images with similar foreground/background textures and/or colors produced by such existing, color-based approaches, however, are oftentimes unsatisfactory to a user, as the resulting mattes often contain low frequency smearing or high frequency chunky artifacts. While the existing methods may perform well for high-contrast foreground/background images (e.g., a person with dark hair on a white background, or a person not wearing green against a green screen), such methods cannot adequately handle complex real-life images, for example, a woman wearing fur in front of a cityscape with buildings, cars, and trees.

Accordingly, embodiments of the present invention are directed to facilitating efficient and effective image matting. In this regard, a matte for an image provided by a user can be generated that accurately reflects foreground/background combination regions (or blended regions) of the object. Such a matte can be used to more precisely extract an object from an image. For example, if the object is a lattice ball, such a matte will allow for extraction of the lattice ball in a manner allowing new background information to be visible through the holes of the lattice ball when the ball is placed on a new background.

At a high-level, a neural network system is utilized to generate accurate mattes. In particular, a neural network system uses structure and texture information in addition to color to generate accurate mattes. A neural network is a computational approach loosely based on how the brain solves problems using large clusters of connected neurons. Neural networks are self-learning and trained so that a generated output reflects a desired result. As described herein, a neural network system can be trained using several neural networks. In such a system, a first neural network, for example, a matting neural network, can be trained to generate a matte based on an input image and corresponding trimap designating known foreground and background regions and unknown foreground/background blended regions. The first neural network predicts alpha values for each pixel of the input image to create a matte. The first neural network is then trained based on the accuracy of these predicted alpha values. A second neural network, for example, a refining neural network, can be trained to take the matte from the first neural network and refine the matte to further increase the accuracy of the alpha values and/or create sharper edges. Although generally described as separate neural networks, any number of neural networks, including a single neural network, can be trained in accordance with embodiments described herein.

Generally, to train a matting neural network, the matting neural network can output a training matte based on a training input image and its associated trimap. Such a training matte can contain estimated alpha values for each pixel. Thereafter, the training matte is compared with a reference matte, known as the ground truth matte, to determine errors between the training matte and the reference matte. Errors can include incorrectly predicted alpha values for pixels of the image that are identified based on the matte comparison. Errors can be determined by extracting the object from the input image using the reference matte and, separately, using the training matte and, thereby placing the extracted objects on the same new background to compare any RGB differences between the composite images. Such errors are then fed back through the matte neural network to appropriately train the neural network, for instance, by adjusting the weight of the network connections to reduce the value of the error.

A similar process can be performed to train a refining neural network. More specifically, a training matte, for example, the training matte produced by the matte neural network, and a corresponding training input image can be provided to the refining neural network to output a training refined matte. The training refined matte can then be compared to a reference matte, known as the ground truth matte, to determine errors between the training refined matte and the reference matte. Such errors are then fed back through the refining neural network to appropriately train the neural network, for instance, by adjusting the weight of the network connections to reduce the value of the error.

This process can be repeated for a sufficiently large number of training cycles, until the neural network system converges to a state where the error of the calculations is small enough such that the output mattes reach a desired threshold level of similarity to the reference mattes. In other words, training can continue until predicted alpha values are within a desired threshold level of similarity. As can be appreciated, training the matte neural network and the refining neural network may occur sequentially or concurrently.

Training a neural network system to generate mattes for an input image, as described herein, ensures accurate extraction of an object from the input image. To this end, during the training process, the neural network system learns to take into account differences between the matte generated from an input image and a reference matte corresponding to the foreground object in the input image based on predicted alpha values. Such training ensures that the neural network system recognizes not only the difference between foreground/background based on color but also what a matte for certain structures is supposed to look like. For example, in accordance with embodiments of the present invention, a neural network system can be trained to not only able to utilize color to create a matte but also to learn structure, for example, what hair and fur are supposed to look like. Such a system can also be trained to learn patterns, such as blurriness in a transition from foreground to background. In addition, such a system can learn to recognize features likely to have foreground/background combination regions, for example, recognizing that a face will have hair around it.

As described herein, to create a robust system capable of handling a wide array of subject matters, a large number and variety of images is often helpful. It is difficult to create an adequate training dataset to accomplish such robust training because images used for matting should avoid blur from movement to generate accurate mattes. Thus, outdoor images for training can be made useless because of unintended movement by, for example wind. Similarly, an image of a living creature, such as, a person or animal, can be useless because of movement of the subject. As such, in accordance with embodiments of the present invention, synthetic composite images can be generated for adequately training a matting neural network system to train the system to not only utilize color to create a matte but also to learn structure, texture, and/or patterns.

Turning to FIG. 1, FIG. 1 is a diagram of an environment 100 in which one or more embodiments of the present disclosure can be practiced. The environment 100 includes one or more user devices, such as a user devices 102A-102N. Examples of the user devices include, but are not limited to, a personal computer (PC), tablet computer, a desktop computer, a processing unit, any combination of these devices, or any other suitable device having one or more processors. Each user device can include at least one application supported by the creative apparatus 108. It is to be appreciated that following description may generally refer to the user device 102A as an example and any other user device can be used.

A user of the user device can utilize various products, applications, or services supported by the creative apparatus 108 via the network 106. The user devices 102A-102N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manages digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes the creative apparatus 108.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 102A-102N can be connected to a creative apparatus 108 via a network 106. Examples of the network 106 include, but are not limited to, internet, local area network (LAN), wireless area network, wired area network, wide area network, and the like.

The creative apparatus 108 includes one or more engines for providing one or more digital experiences to the user. The creative apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 108 also includes a data storage unit 112. The data storage unit 112 can be implemented as one or more databases or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user can create an account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription account and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

In some embodiment, the user management engine 116 and the entitlement engine 124 can be one single engine performing the functionalities of both the engines.

The user can then install various applications supported by the creative apparatus 108 via an application download management engine 126. Application installers or application programs 128 present in the data storage unit 112 are fetched by the application download management engine 126 and made available to the user directly or via the application manager. In one embodiment, an indication of all application programs 128 are fetched and provided to the user via an interface of the application manager. In another embodiment, an indication of application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages the process of providing updates to the user device 102A.

Upon download, installation and launching of an application program, in one embodiment, the user is asked to provide the login details. A check is again made by the user management engine 116 and the entitlement engine 124 to ensure that the user is entitled to use the application program. In another embodiment, direct access is provided to the application program as the user is already logged into the application manager.

The user uses one or more application programs 104A-104N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 130 in the data storage unit 112 by a synchronization engine 132. Alternatively or additionally, such data can be stored at the user device, such as user device 102A.

The application program data 130 includes one or more assets 140. The assets 140 can be a shared asset which the user wants to share with other users or which the user wants to offer on a marketplace. The assets 140 can also be shared across multiple application programs 128. Each asset includes metadata 142. Examples of the metadata 142 include, but are not limited to, font, color, size, shape, coordinate, a combination of any of these, and the like. In addition, in one embodiment, each asset also includes a file. Examples of the file include, but are not limited to, an image 144, text 146, a video 148, a font 150, a document 152, a combination of any of these, and the like. In another embodiment, an asset only includes the metadata 142.

The application program data 130 also include project data 154 and workspace data 156. In one embodiment, the project data 154 includes the assets 140. In another embodiment, the assets 140 are standalone assets. Similarly, the workspace data 156 can be part of the project data 154 in one embodiment while it may be standalone data in other embodiment.

A user can operate one or more user devices to access data. In this regard, the application program data 130 is accessible by a user from any device, including a device which was not used to create the assets 140. This is achieved by the synchronization engine 132 that stores the application program data 130 in the data storage unit 112 and enables the application program data 130 to be available for access by the user or other users via any device. Before accessing the application program data 130 by the user from any other device or by any other user, the user or the other user may need to provide login details for authentication if not already logged in. In some cases, if the user or the other user are logged in, then a newly created asset or updates to the application program data 130 are provided in real time. The rights management engine 136 is also called to determine whether the newly created asset or the updates can be provided to the other user or not. The workspace data 156 enables the synchronization engine 132 to provide a same workspace configuration to the user on any other device or to the other user based on the rights management data 138.

In various embodiments, various types of synchronization can be achieved. For example, the user can pick a font or a color from the user device 102A using a first application program and can use the font or the color in a second application program on any other device. If the user shares the font or the color with other users, then the other users can also use the font or the color. Such synchronization generally happens in real time. Similarly, synchronization of any type of the application program data 130 can be performed.

In some embodiments, user interaction with the applications 104 is tracked by an application analytics engine 158 and stored as application analytics data 160. The application analytics data 160 includes, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. The application analytics engine 158 embeds a piece of code in the applications 104 that enables the application to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" maximum number of times. The output of the application analytics engine 158 is used by a personalization engine 162 to personalize tool menu for the user to show "Tool 4" on top. Other types of personalization can also be performed based on the application analytics data 158. In addition, the personalization engine 162 can also use the workspace data 156 or the user data 118 including user preferences to personalize one or more application programs 128 for the user.

In some embodiments, the application analytics data 160 includes data indicating status of project of the user. For example, if the user was preparing an article in a digital publishing application and what was left was publishing the prepared article at the time the user quit the digital publishing application then the application analytics engine 158 tracks the state. Now when the user next opens the digital publishing application on another device then the user is indicated the state and options are provided to the user for publishing using the digital publishing application or any other application. In addition, while preparing the article, a recommendation can also be made by the synchronization engine 132 to incorporate some of other assets saved by the user and relevant for the article. Such a recommendation can be generated using one or more engines, as described herein.

The creative apparatus 108 also includes a community engine 164 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes the application program data 140. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 works in conjunction with the synchronization engine 132 to provide collaborative workflows to the user. For example, the user can create an image and can request for some expert opinion or expert editing. An expert user can then either edit the image as per the user liking or can provide expert opinion. The editing and providing of the expert opinion by the expert is enabled using the community engine 164 and the synchronization engine 132. In collaborative workflows, a plurality of users are assigned different tasks related to the work.

The creative apparatus 108 also includes a marketplace engine 168 for providing marketplace to one or more users. The marketplace engine 168 enables the user to offer an asset for selling or using. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program data 130. The search engine 170 can perform a search for an asset using the metadata 142 or the file.

The creative apparatus 108 also includes a document engine 172 for providing various document related workflows, including electronic or digital signature workflows, to the user. The document engine 172 can store documents as the assets 140 in the data storage unit 112 or can maintain a separate document repository (not shown in FIG. 1).

Figure 2:
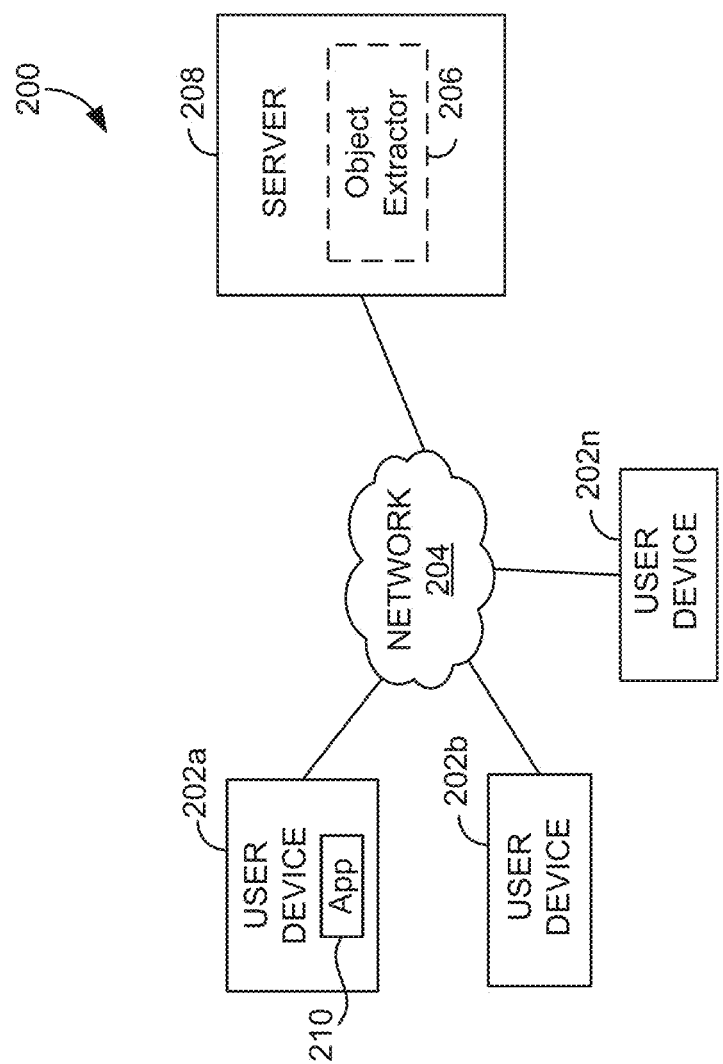
FIG. 2 depicts an example configuration of an operating environment in which some implementations of the present disclosure can be employed, in accordance with various embodiments of the present disclosure.

In accordance with embodiments of the present invention, application programs 128 can include an application, such as application 210 of FIG. 2, that facilitates generating mattes for images used to extract objects from the image. Such an application can be provided to the user device 102A so that the object extractor application operates via the user device. In another embodiment, such an object extractor can be provided as an add-on or plug-in to an application, such as a design or image processing application.

FIG. 2 depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 200 shown in FIG. 2 is an example of one suitable operating environment. Among other components not shown, operating environment 200 includes a number of user devices, such as user devices 202*a* and 202*b* through 202*n*, network 204, and server(s) 208. Each of the components shown in FIG. 2 may be implemented via any type of computing device, such as one or more of computing device 800 described in connection to FIG. 8, for example. These components may communicate with each other via network 204, which may be wired, wireless, or both. Network 204 can include multiple networks, or a network of networks, but is shown in simple form so as not to obscure aspects of the present disclosure. By way of example, network 204 can include one or more wide area networks (WANs), one or more local area networks (LANs), one or more public networks such as the Internet, and/or one or more private networks. Where network 204 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 204 is not described in significant detail.

It should be understood that any number of user devices, servers, and other components may be employed within operating environment 200 within the scope of the present disclosure. Each may comprise a single device or multiple devices cooperating in a distributed environment.

User devices 202*a* through 202*n* can be any type of computing device capable of being operated by a user. For example, in some implementations, user devices 202*a* through 202*n* are the type of computing device described in relation to FIG. 8. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 210 shown in FIG. 2. Application 210 is referred to as a single application for simplicity, but its functionality can be embodied by one or more applications in practice. As indicated above, the other user devices can include one or more applications similar to application 210.

The application(s) may generally be any application capable of facilitating the exchange of information between the user devices and the server(s) 208 in carrying out extracting a foreground object from an image using a matte. In some implementations, the application(s) comprises a web application, which can run in a web browser, and could be hosted at least partially on the server-side of environment 200. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 210 can facilitate extracting an object from an image using a matte. In particular, a user can select or input an image or picture from which an object is to be extracted using a matte. An image and/or picture can be selected or input in any manner. For example, a user may take a picture using a camera on a device, for example, user device 202*a*. As another example, a user may select a desired image from a repository, for example, stored in a data store accessible by a network or stored locally at the user device 202*a*. Based on the input image, an object can be extracted from the input image and provided to the user via the user device 202*a*. In addition, a user can select, for example, a new background for the extracted object. In this regard, the composite image of the extracted object on the new background can be displayed via a display screen of the user device.

As described herein, server 208 can facilitate extracting foreground objects from an image using a matte via object extractor 206. Server 208 includes one or more processors, and one or more computer-readable media. The computer-readable media includes computer-readable instructions executable by the one or more processors. The instructions may optionally implement one or more components of object extractor 206, described in additional detail below.

Object extractor 206 can train and operate a neural network system in order to extract foreground objects from an image using a matte. Such a neural network system can be comprised of one or more neural networks trained to generate designated output. For example, a neural network system can include a first neural network, such as a matting neural network, that generates mattes for input images and a second neural network, such as a refining neural network, that generates refined mattes from the mattes generated by the first neural network.

At a high level, object extractor 206 trains a neural network system, for example, including a matting neural network and a refining neural network. To train the matting neural network, a matte can be generated using the matting neural network based on an input image. The matte generated by such a system can include predicted alpha values for pixels in the input image. Such an input image can be a synthetic composite image generated by compositing a foreground object onto a background. An input image generally refers to an image provided to the neural network system, or portion thereof. Input images used to train the matte neural network may be referred to herein as training images or training input images. Typically, a trimap will be input along with such an image. A trimap is used to help constrain the area of the image for which pixel foreground/background composition needs to be determined. A trimap generally marks certain regions of an image as pure foreground and/or pure background with the area surrounding the foreground object marked as unknown indicating that pixels in that area are likely to be a blend of foreground and background. In this regard, a trimap can include three regions, a foreground region of pure foreground color pixels, a background region of pure background color pixels, and a blended region where pixels include an unknown combination of foreground and background color.

A matte generally refers to a matte generated to indicate the alpha values of pixels comprising an image. Mattes generated in accordance with training the matting neural network may be referred to herein as training mattes. The generated training mattes can be compared to a reference matte to facilitate training of the matting neural network. In this regard, the matting neural network can be modified or adjusted based on the comparison such that the quality of subsequently generated mattes increases. One way in which quality can be determined is based on accuracy of the predicted alpha values for each pixel that comprise the generated matte. Such training helps to maintain details of a foreground object in an input image during the matting process.

In accordance with embodiments described herein, a training input image used to generate a training matte can be generated by compositing an extracted foreground object and a background. As used herein, a reference matte refers to a matte associated with the extracted foreground object used to composite a training image. Such a reference matte is used as a standard, or ground-truth, for evaluating the quality of a matte generated from the training image by the matting neural network, and can contain ground-truth alpha values for pixels in the training image.

To train the refining neural network, a training input image, for example, the training input image provided to the matting neural network, concatenated with a matte, for example the matte generated by the matting neural network, may be provided to the refining neural network. Such a refining neural network generates a refined matte from the concatenated training input image and matte. Although the image provided to the refining neural network is generally referred to herein as the training image, as can be appreciated, the image may be, but need not be, the training image input into the matting neural network. As such, images used to train the refining neural network are referred to as training images. In addition to, or in the alternative to using training mattes produced by the matting neural network, other training mattes can be provided to the refining neural network for training in accordance with embodiments described herein. As such, mattes used to train a refining neural network may be referred to as training mattes. In embodiments, a refined matte reflects a sharper and/or clearer matte. A refined matte generally refers to a refined matte generated via a refining neural network. A training refined matte refers to a refined matte that is used to train the refining neural network. A reference matte refers to a matte used as a standard for evaluating the quality of a training refined matte. Such a reference matte can contain alpha values for pixels used to determine accuracy of predicted alpha values of a training matte and/or a training refined matte.

In various implementations, a neural network system, comprised of a matting neural network and a refining neural network, of object extractor 206 is iteratively trained using multiple training input image/trimap pairs to generate training mattes and training refined mattes. This training process can occur separately for the matte and refining neural networks or simultaneously. In each iteration, object extractor 206 can select a training image/trimap pair and an associated reference matte. Object extractor 206 uses a matting neural network to generate a training matte from the input training image/trimap pair. The training matte can then be compared to the reference matte to compute any errors. Further errors can be determined by using the training matte and the reference matte to extract the object from the input image, place the extracted objects onto a new background, and then determine the differences between the two training composite images. Such errors can then be fed back through the matting neural network to teach the network to reduce such errors in future iterations. These errors can be based on the accuracy of predicted alpha values of the training matte as compared to ground-truth alpha values of the reference matte.

Object extractor 206 can then use a refining neural network to refine a matte, for example, to refine the training matte of the matting neural network. Such a matte can be input along with the training image used to generate the training matte. The refining neural network can output a training refined matte. The training refined matte can then be compared to the reference matte to compute any errors. Such errors are then fed back through the refining neural network to teach the network to reduce such errors in future iterations. These errors can be based on the accuracy of predicted alpha values of the training refined matte as compared to ground-truth alpha values of the reference matte.

For cloud-based implementations, the instructions on server 208 may implement one or more components of object extractor 206, and application 210 may be utilized by a user to interface with the functionality implemented on server(s) 208. In some cases, application 210 comprises a web browser. In other cases, server 208 may not be required. For example, the components of object extractor 206 may be implemented completely on a user device, such as user device 202a. In this case, object extractor 206 may be embodied at least partially by the instructions corresponding to application 210.

Thus, it should be appreciated that object extractor 206 may be provided via multiple devices arranged in a distributed environment that collectively provide the functionality described herein. Additionally, other components not shown may also be included within the distributed environment. In addition, or instead, object extractor 206 can be integrated, at least partially, into a user device, such as user device 202a. Furthermore, object extractor 206 may at least partially be embodied as a cloud computing service.

Figure 3:
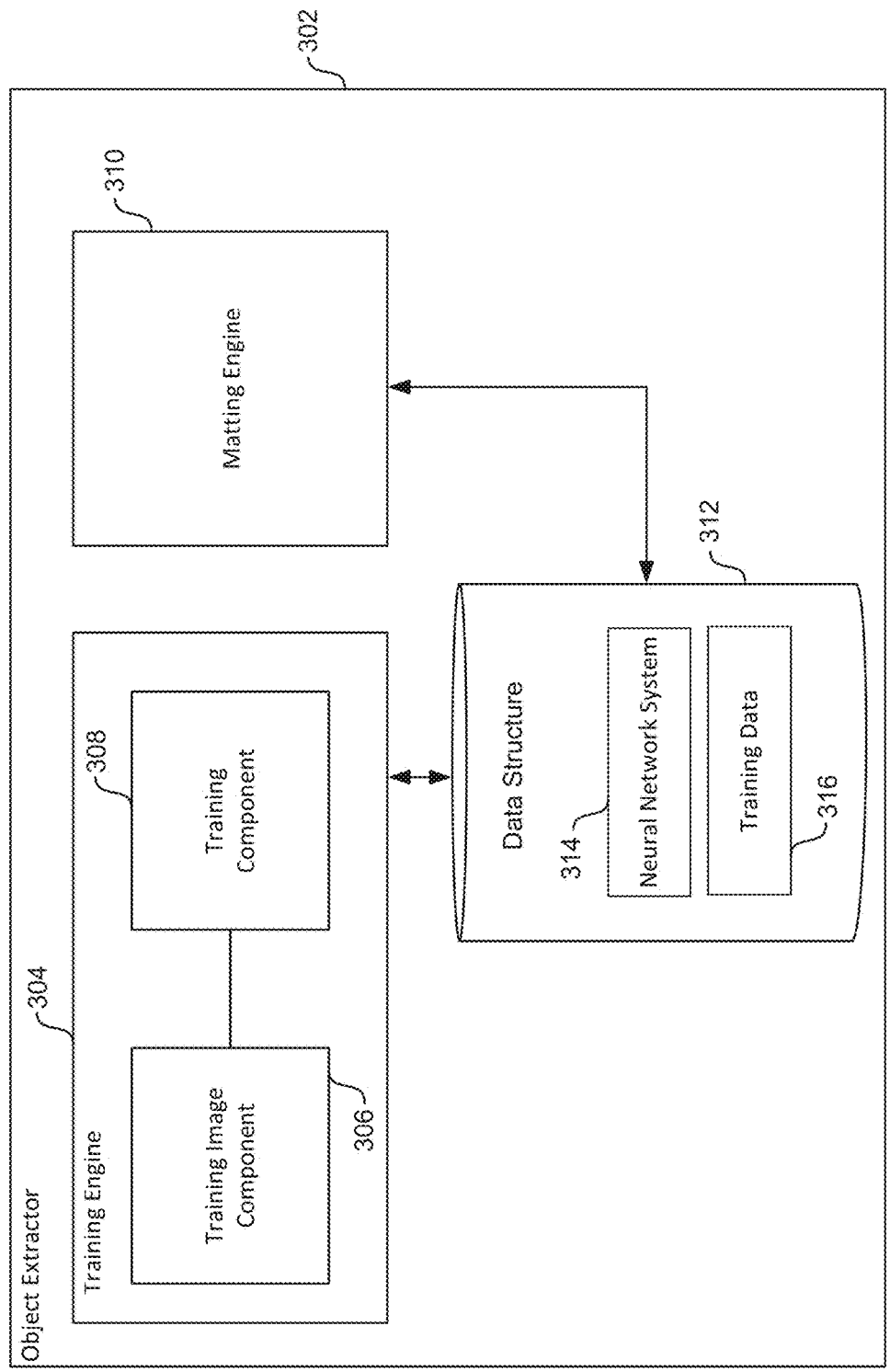
FIG. 3 depicts aspects of an illustrative object extracting system, in accordance with various embodiments of the present disclosure.

Referring to FIG. 3, aspects of an illustrative object extracting system are shown, in accordance with various embodiments of the present disclosure. Object extractor 302 includes training engine 304, matting engine 310, and data store 312. The foregoing components of object extractor 302 can be implemented, for example, in operating environment 200 of FIG. 2. In particular, those components may be integrated into any suitable combination of user devices 202a and 202b through 202n, and server(s) 208.

Data store 312 can store computer instructions (e.g., software program instructions, routines, or services), data, and/or models used in embodiments described herein. In some implementations, data store 312 stores information or data received via the various components of object extractor 302 and provides the various components with access to that information or data, as needed. Although depicted as a single component, data store 312 may be embodied as one or more data stores. Further, the information in data store 312 may be distributed in any suitable manner across one or more data stores for storage (which may be hosted externally).

In embodiments, data stored in data store 312 includes training data 316. Training data generally refers to data used to train a neural network, or portion thereof. As such, training data 316 can include reference mattes, reference extracted foreground objects, reference composite images, background images, training images, training mattes, training refined mattes, training extracted foreground objects, training composite images and/or training trimaps. In some cases, data can be received by object extractor 302 from user devices (e.g., an input image/trimap received by user device 202a or another device associated with a user, via, for example, application 210). In other cases, data can be received from one or more data stores in the cloud.

Data store 312 can also be used to store neural network system 314. Such a neural network system can be comprised of one or more neural networks, such as a matte neural network and a refining neural network.

Training engine 304 can be used to train neural network system 314. Such a neural network system can be used to create mattes for input images. In embodiments, the mattes generated from a neural network system are used to extract foreground objects from input images. Such extracted objects can then be manipulated to create composite images, for example, extracting a beach ball from a beach scene using a matte and placing the extracted beach ball onto a snow scene. As depicted in FIG. 3, training engine 304 includes a training image component 306 and a training component 308. Although a training image component and training component are illustrated separately, as can be appreciated, the functionality described in association therewith can be performed by any number of components.

Training image component 306 can generate training images using reference extracted foreground objects and background images to create synthetic composite images. Reference extracted foreground objects can be extracted from high-contrast photographs, or images, using, for example, Photoshop®. Such high-contrast photographs, or images, can be obtained from various sources. For example, images can be select frames from a video. Background images can include photographs, or images, containing different scenes and/or textural details. Background images can be obtained from various sources. In some embodiments, training image component 306 generates training images that include a vast array of colors, textures, and subject matters to ensure that the neural network system is capable upon completion of its training of recognizing a wide variety of colors, patterns, structures of subjects, and/or relationships between objects depicted in input images. Having training image component 306 create composite images with similar foreground and background colors and complex background textures for training the neural network system results in a more robustly trained system capable of extracting objects from complex images.

Training image component 306 can also be used to implement augmentation methods to further enlarge the dataset for training a neural network system. Training images can be augmented in any number of ways to expand the data set of training images. Expanding the dataset in such a manner during training results in a more finely tuned system for generating mattes from input images that are less prone to over-fitting. One method of augmentation includes cropping 320×320 image/trimap pairs centered on pixels in unknown regions to increase the sampling space. In addition, or alternatively, image/trimap pairs can be cropped to different sizes, for example, 480×480 or 640×640 and then resized to 320×320 to make the method more robust to scale and better learn context and semantics. Another method includes flipping the orientation of extracted reference objects. Additionally, the trimap for each training image/trimap pair can be modified for different training iterations and/or modified using the reference matte for more robust trimap placement. Such an augmented dataset can be stored, for example, in training data 316 on data store 312.

Training image component 306 can also be used to generate training trimaps. Trimaps are used to help constrain the area of an image for which pixel foreground/background composition needs to be determined. As such, trimaps indicate regions of an image for which pixels are likely to be a blend of foreground information and background information, and thus, an alpha value needs to be determined to solve the percentages of blend. Trimaps can be generated by a user selecting unknown regions of a training image. For example, a user can trace and/or outline portions of a training image and indicate whether a traced and/or outlines portion is known foreground, known background, or an unknown region. Alternatively, trimaps can be generated by binary selection, using, for example, tools within Photoshop®, where an unknown area is outlined around the foreground object of an image and a slider can be used to expand/contract the band to encompass the unknown regions. Another method includes using an algorithm to create a trimap; this method can be utilized when the subject matter is known, for example, if the image is a person, an algorithm can be trained to recognize that a larger band is needed around regions containing hair and thinner bands around regions of skin and/or smooth clothes.

Training component 308 can select a training image for training a neural network system, for example, to train a matte neural network within such a system. Such a training image can be generated, for example, using training image component 306. Alternatively, such a training image can be selected, for example, from training data 316 on data store 312. A training image can include a training extracted object composited with a background image, creating a synthetic composite image. In addition to a training image, training component 308 can select a trimap that corresponds to the training image. For example, the trimap can indicate the pixels of the training image that are pure foreground and pure background as well as the pixels with unknown foreground and background information that are potentially a blend of both foreground and background. The matting neural network outputs a matte from the concatenated training input image/trimap. Such an output matte can be based on predicted alpha values for the pixels of the training image. Generating such a matte can be accomplished, for example, by downsampling the training input image/trimap to a lower dimension. Based on the downsampled training input image and trimap pair, a sequence of non-linear transformations is applied using a number of filters to generate a training matte. Thereafter, the training matte is upsampled to the desired output size.

One implementation employs an encoder-decoder-like architecture. Specifically, the architecture can be a four-channel input into an encoder network. The input into the encoder network is transformed into downsampled feature maps using subsequent convolutional layers and max pooling layers. Next, a decoder network uses subsequent unpooling layers to reverse the max pooling operations and convolutional layers to upsample the feature maps into a training matte. Such an encoder network can have, for example, 14 convolutional layers and 5 max-pooling layers. Each layer is trained to analyze certain features and/or elements of the input image. For example, the first layer may be trained to detect edges, colors, and/or patterns. Such a network can use an asymmetric structure to reduce the number of parameters, further described below, and speed up the training process. Specifically, the decoding portion of the network can have, for instance, six convolutional layers, five unpooling layers, and a final alpha prediction layer. The final layer of the network can be an alpha prediction layer where alpha values are predicted for the training input image.

The matting neural network can then be trained by evaluating different types of loss to determine any errors or discrepancies therebetween, as described in more detail below. Errors can include inaccuracies, flaws, variations, and/or divergences between the training output and the desired output, often referred to as the ground-truth or output if the network was perfectly trained. Such errors can be determined by comparing parameters of the training output and the ground-truth to find a loss function. In some embodiments, updating the neural network involves feeding errors back through the matting neural network so the algorithm can adjust network connections in order to reduce the value of the error.

Adjusting the neural network to correct for errors is accomplished by changing at least one node parameter of such matting neural network. The matting neural network can comprise a plurality of interconnected nodes with a parameter, or weight, associate with each node. While individual parameters do not have to be specified during training of a neural network, the network tends to learn parameters that identify edge detection, RGB color, textures of features, roughness and/or blur of a matte or a composite image generated using the matte. Each node receives inputs from multiple other nodes and can activate based on the combination of all these inputs, for example, when the sum of the input signals is above a threshold. The parameter can amplify or dampen the input signals. For example, a parameter could be a value between zero and one. The inputs from each node can be weighted by a parameter, or in other words, multiplied by the parameter, prior to being summed. In this way, the parameters can control the strength of the connection between each node and the subsequent node. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation.

Errors can be determined, for example, using loss functions, such as pixel loss, compositional loss, or the like. Errors determined using loss functions are used to minimize loss in the matting neural network by backwards propagation of such errors through the network.

In embodiments, errors can be determined by evaluating pixel loss, which is the absolute difference between values of a reference matte, or ground-truth matte, and the training matte for alpha values at each pixel. Pixel loss can be analyzed by comparing the black/white percentage, color differences, and/or alpha values between pixels of the reference matte and the corresponding pixels of the training matte. This can be determined by finding the average per-pixel differences between the reference matte and the training matte. An example equation that can be utilized for determining pixel loss is $\mathcal{L}_\alpha^i = \sqrt{(\alpha_p^i - \alpha_g^i)^2 + \epsilon^2}$, $\alpha_p^i, \alpha_g^i \in [0,1]$; where $\alpha_p^i$ is the output of the prediction layer at pixel i. $\alpha_p^i$ can further be set to a value between zero and one. $\alpha_g^i$ is the ground truth alpha value at pixel i. $\epsilon$ is a small value which can be set equal to $10^{-6}$.

In embodiments, errors can be determined by evaluating compositional loss. Compositional loss can be determined by calculating the differences between the ground truth RGB colors and the predicted RGB colors of composited images. Such composited images can be generated by using the reference matte, based on predicted alpha values, and the training matte, based on ground-truth alpha values, to extract the object from the input image, and then compositing the object onto a new background. The two composited images can then be compared at each pixel to determine any differences. An example equation for approximating compositional loss is $\mathcal{L}_c^i = \sqrt{(c_p^i - c_g^i)^2 + \epsilon^2}$; where c denotes each channel of the RGB image, p denotes the image composited by the training matte, and g denoted the image composited by the reference matte. The compositional loss constrains the network to follow the compositional operation, which usually leads to more accurate matte predictions.

Because the alpha values inside the unknown regions of trimaps where pixels are likely to be a blend of foreground and background information need only be inferred, the weights on pixel loss and composite loss can be set according to the pixel locations, which can help the network pay more attention to important areas of a training image. Specifically, $w_i=1$ if pixel i is inside the unknown region of the trimap, whereas $w_i=0$ if pixel i is outside the unknown region of the trimap.

Training component 308 can further train a refining neural network. In this regard, a training matte, such as the training matte output by the matting neural network, can be provided to a neural network system, specifically to a refining neural network within such a system. In addition to such a training matte, an input image can be provided to the refining neural network. Such an input image can be, for example, the input image provided to the matting neural network for which the training matte was generated. As described, a training matte can be produced by the matting neural network. Alternatively, a training matte and its associated training image can be selected from training data 316 in data store 312. The refining neural network can produce a training refined matte based on an input training matte and its corresponding training input image. The refining neural network can then be trained by evaluating differences between a reference matte and the training refined matte to determine any errors or differences therebetween. In some embodiments, modifying or training the neural network involves feeding such errors back through the refining neural network so the algorithm can adjust network connections in order to reduce the value of the error.

One implementation employs an extended network to further refine the output of the matting neural network to correct any overly smooth results and/or other errors. This extended network allows for more accurate mattes with sharper edges. The input to the refining neural network is a concatenation of a training image and its matte from the matting neural network. Such an input can be scaled between 0 and 255, resulting in a four-channel input. The output of the extended network is a training refined matte.

Such an extended network can be a fully convolutional network including four convolutional layers where the first three layers can be followed by non-linear rectified linear unit layers that can increase the non-linear properties of the network without affecting the convolution layers. This extended network may not utilize any downsampling layers in order maintain details that may have been lost during the matting neural network downsampling/upsampling process. Such a network can utilize a skip-model structure where the fourth channel of the input data is scaled between zero and one and then added with the output of the network.

An extended neural network can allow for breaking large images into tiles and running the input image tiles through the matting neural network when an image it too large for the matting neural network to process. Input images can be broken into image tiles when the neural network system, specifically the matting neural network, cannot process the input image in its full size. When processing the input image using a CPU, the system can handle larger images; however, this can be a much slower process. Processing input images using the GPU allows for much faster processing but may result in using smaller input images. The size of image the matting neural network can handle depends on the capabilities of the GPU being used to run the matting neural network. For example, a high-end GPU with twelve gigabytes will be able to process larger images than a typical consumer GPU with two gigabytes. To accomplish such tiling of an image, the input image could be broken into overlapping smaller images, for example, 500×500 with 50 pixels of overlap. Tiling of input images for the matting neural network can result in artifacts where the tiles transition from one tile to the next upon compiling the tile images into a final image. As such, a refining neural network can be trained to remove any such artifacts. In embodiments, the refining neural network is capable of being trained as such because the refining neural network requires less computational power, and can therefore run the entire input image without tiling.

Alternatively, or in addition, a refining neural network can allow the matting neural network to be run at a lower resolution and then upsampled to a desired resolution to create the output matte. The refining neural network can be trained to remove and/or fix any blur and/or sharpen the matte output by the matting neural network in such an implementation.

Adjusting the neural network to correct for errors is accomplished by changing at least one node parameter of such a refining neural network. The refining neural network can comprise a plurality of interconnected nodes with a parameter, or weight, associated with each node. Each node receives inputs from multiple other nodes and can activate based on the combination of all these inputs, for example, when the sum of the input signals is above a threshold. The parameter can amplify or dampen the input signals. For example, a parameter could be a value between zero and one. The inputs from each node can be weighted by a parameter, or in other words multiplied by the parameter, prior to being summed. In this way, the parameters can control the strength of the connection between each node and the next. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation.

In embodiments, errors are determined by evaluating differences between a reference matte and the training refined matte using any number of methods. To this end, the network can be trained by evaluating differences between a reference matte and the training refined matte produced by the refining neural network. Training involves modifying the neural network based on the differences between the reference matte and the training output refined matte. Such modification of the neural network can involve changing at least one of the node parameters.

Errors can be determined using loss functions, which are used to minimize loss in the training neural network by backwards propagation of such errors through the network. For example, such differences can be analyzed by determining pixel loss, which is the absolute difference between reference matte values and the training refined matte values at each pixel. Pixel loss can be analyzed by comparing the differences between pixels of the reference matte, based on further predicted alpha values, and the corresponding pixels of the training refined matte, based on ground-truth alpha values. This can be determined by finding the average per-pixel differences between the reference matte and the training refined matte. An example equation that can be utilized for determining pixel loss is $\mathcal{L}_\alpha^i = \sqrt{(\alpha_p^i - \alpha_g^i)^2 + \epsilon^2}$, $\alpha_p^i, \alpha_g^i \in [0,1]$; where $\alpha_p^i$ is the output of the prediction layer at pixel i and is further set to between zero and one. $\alpha_g^i$ is the ground truth alpha value at pixel i. $\epsilon$ is a small value which can be set equal to $10^{-6}$.

In execution, a neural network system, trained according to the present disclosure, can be used to extract foreground objects from input images using a generated matte based on predicted alpha values for the input image. Such matting and object extraction can be performed using matting engine 310. As can be appreciated, a trained neural network system, such as a trained matting neural network and a trained refining neural network, can be used by the matting engine to generate mattes for use in extracting foreground objects from images. The method of creating mattes can be similar to the process described for training the neural network system, however in execution, input images are typically not generated synthetic composite images as training input images were during training. It should be appreciated that such a neural network system can include both a matting neural network and a refining neural network, however, in some embodiments, the refining neural network is not required and the neural network system can be comprised of only the matting neural network and/or additional trained neural networks.

In embodiments, matting engine 301 can be used to run a trained neural network system to generate a matte for an input image where alpha values for the pixels of the input image are predicted by the trained neural network system. An image can be received from a user at a user device. In particular, a user can select or input an image or picture from which an object is to be extracted using a matte. Such an image can include a picture taken by a user using a computing device such as those described with reference to FIG. 8. An image and/or picture can be selected or input in any manner. For example, a user may take a picture using a camera on a device, for example, user device 202a of FIG. 2. As another example, a user may select a desired image from a repository, for example, stored in a data store accessible by a network or stored locally at the user device 202a of FIG. 2. In other embodiments, a user can input the image by inputting a link or URL to an image. Alternatively, a user could select an image from a group of images stored in a database, such as data store 312 of FIG. 3. In addition to the input image, an associated trimap can be input. Such a trimap can be input by a user or utilizing an algorithm without user interaction. Based on the input image and, in some embodiments, an associated trimap, a matte for the input image can be generated by the matting engine.

Such a trained neural network system is capable of generating a matte for images that have associated trimaps where all, or the majority, of the pixels are designated as mixed foreground/background. In other words, images with trimaps where each, or the majority of the pixels need to be solved for a blend of foreground/background percentage. For example, an image of a spider web in front of a forest background results in the majority of the image being marked as an unknown area to solve for foreground/background percentages.

After the neural network system generates a matte based on an input image and, in some embodiments, an associated trimap, matting engine 310 can be used to extract a foreground object from the input image using the matte. Such an extracted foreground object can be provided to a user via a user device, for example, user device 202a.

In addition, matting engine can be used to generate a composite image using such an extracted foreground object and a background image. A user can select, for example, a new background for the extracted foreground object. In this regard, the composite image of the extracted foreground object on the new background can be displayed via a display screen of the user device.

Matting engine 310 can also perform this entire process. For instance, a user can input an image of a person standing in front of a cityscape background, the neural network system can generate a matte for the image that can be used to extract the person, using predicted alpha values of the matte, from the input image, and then place the extracted person onto a new background image, for example, onto a beachscape.

Figure 4:
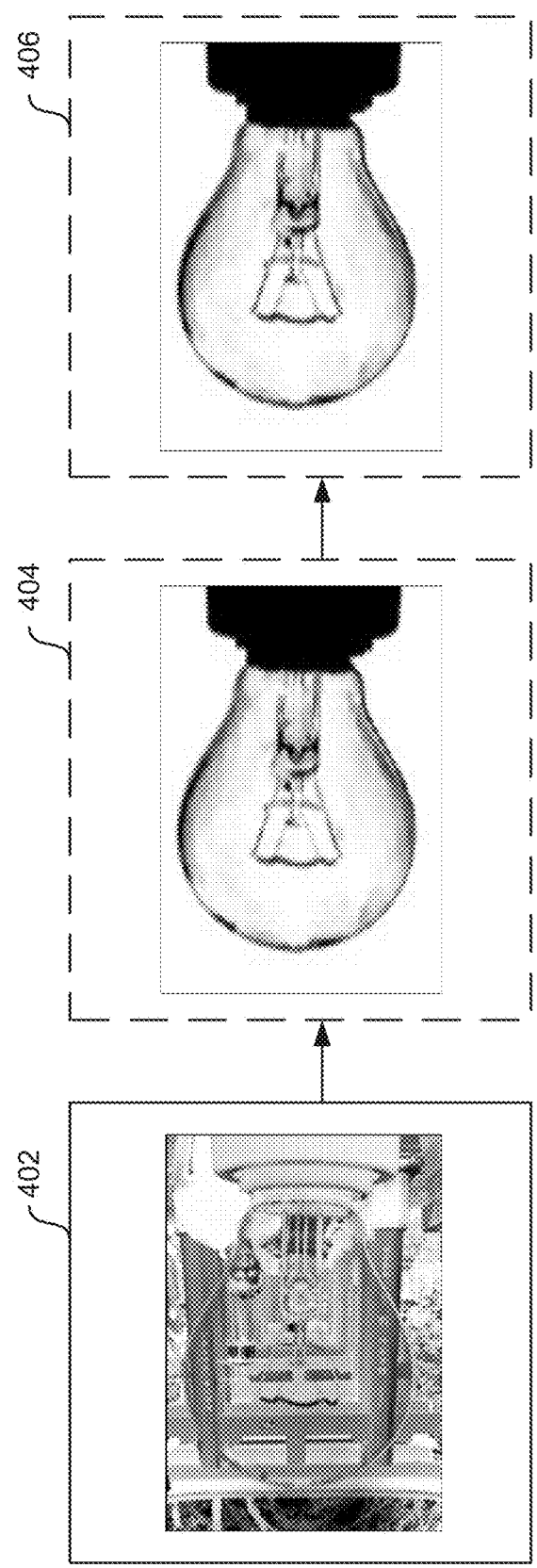
FIG. 4 provides an illustrated method of generating a matte from an input image, in accordance with embodiments of the present disclosure.

Turning now to FIG. 4, FIG. 4 provides an illustrated method of generating a matte from an input image, in accordance with embodiments of the present disclosure. In embodiments for training a neural network system, input image 402 can be a synthetic composite training image. To create such an image, a high-contrast image can be used to extract a foreground object from the image using a highly accurate matte (e.g. where alpha values are easily determined); such an extracted foreground object can then be placed onto a new background image. For example, each extracted foreground object can be placed onto up to 100 backgrounds. For a training dataset with 493 extracted foreground objects, this results in a training set of 49,300 training images. As illustrated in FIG. 4, the extracted foreground object of image 402 is a light bulb and the background image is a person standing in front of a sequence of Japanese torii gates. Image 402 can then be used to generate a matte 404. Image 402 can be input along with an associated trimap (not pictured). In this embodiment, matte 404 is compared with the reference matte (not shown) used to extract the foreground object, the light bulb, of image 402. A first neural network, for example, a matting neural network, can produce a matte 404 for image 402. The matting neural network can be trained by evaluating differences between the reference matte used to extract the foreground object of image 402 and matte 404 produced by the matting neural network. Such differences can be determined utilizing pixel loss, or the difference between predicted alpha values of the training matte and ground-truth alpha values of the reference matte. The matting neural network can also be trained by evaluating differences between an output training composite image (not shown) generated using output matte 404 and a training background and a reference composite image (not shown) generated using reference matte and the training background. Such difference can be determined utilizing compositional loss.

Matte 404 can then be used to train a second natural network, for example, a refining neural network, to generate training refined matte 406 from a training matte generated by a matting neural network and its associated training input image. The refining neural network can be trained by evaluating differences between a reference matte and refined matte 406 produced by the refining neural network. Such differences can be determined utilizing pixel loss, or the difference between predicted alpha values of the training refined matte and ground-truth alpha values of the reference matte. It should be appreciated that this training process can occur separately or simultaneously. It should also be appreciated that embodiments of the neural network system exist where the neural network system comprises a matting neural network without a refining neural network.

In other embodiments, to use a trained neural network for generating a matte from an input image for extracting an object from the input image, a user inputs image 402 into an object extractor system, for example, object extractor 206 as described with reference to FIG. 2 and/or object extractor 302 as described with reference to FIG. 3. The image can be input by a user taking a picture using a camera on a device and/or providing a URL to an image, for example. A trained neural network system, such as neural network system 314 run using matting engine 310 as described with reference to FIG. 3, can create matte 404 for image 402, wherein the matte includes predicted alpha values determined using the trained neural network system. Matte 404 can be an intermediate matte that is utilized by the object extractor system to create refined matte 406, which can be used by the object extractor system to extract an object from image 402. Refined matte 406 can include further predicted alpha values determined using the trained neural network system. Alternatively, refined matte 406 does not need to be generated and matte 404 can be used by the object extractor system to extract an object from image 402. Matte 404 and/or refined matte 406 do not have to be displayed to the user but, in some embodiments, one or both can be displayed. Object extractor system can use matte 404 and/or matte 406 to extract an object, in this case the light bulb, from image 402. Such an extracted object can be displayed to a user on a user device, for example user devices 202*a* through 202*n*. Such a user device can be a computing device, such as computing device 800 further described with reference to FIG. 8. Additionally, a user can interact with such an extracted object, for example, by selecting a new background onto which to place the extracted object. Interaction with the extracted object can occur using techniques for placement on the new background including by using a touch screen, a stylus, a mouse, and/or a track pad.

Figure 5:
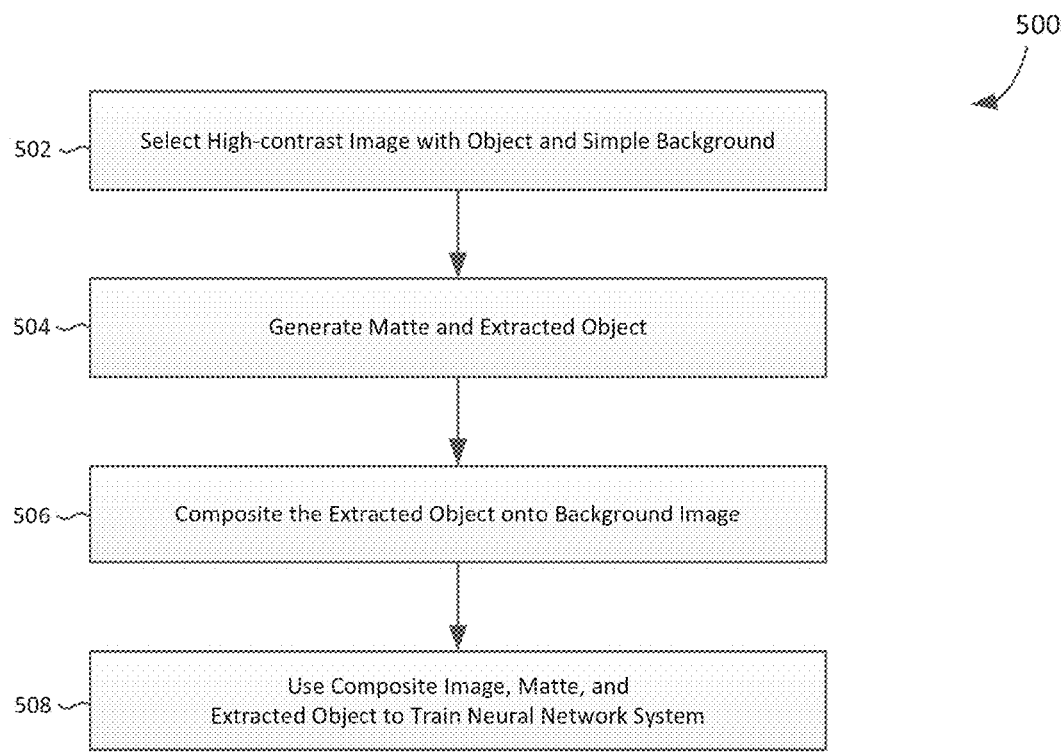
FIG. 5 illustrates a process flow showing an embodiment for generating synthetic composite training images for training a neural network system to generate mattes for input images, in accordance with embodiments of the present invention.

With reference to FIG. 5, a process flow is provided showing an embodiment of method 500 for generating training synthetic composite images for training a neural network system to generate mattes for input images, in accordance with embodiments of the present invention. Method 500 can be performed, for example by training image component 306 of object extractor 302, as illustrated in FIG. 3.

At block 502, a high-contrast image with an object and a simple background can be selected. Such an image can be selected from a group of images stored in a database, such as data store 312 of FIG. 3. A high-contrast image is an image where there is significant contrast between the foreground object(s) and the image background. In addition, a high-contrast image will have a simple background meaning that the texture of the background and foreground are dissimilar. For instance, some examples of high-contrast images with simple backgrounds are a dark brown dog on a white background or a woman with dark hair wearing a black dress on a green screen.

At block 504, a matte can be generated for the high-contrast image. Because the image is high-contrast, current methods can produce a high quality matte including highly accurate predicted alpha values. Such a matte can be used as a reference matte for training a neural network system for creating mattes for complex images, images for which current methods have difficulty producing accurate mattes. This matte can be treated as a ground-truth matte against which training mattes produced by the neural network system can be compared during training. One way for generating such a matte from a high-contrast image can be using editing features in Photoshop®. Once the matte is generated, at block 504, the object in the high-contrast image can be extracted. Such an object can be extracted from the high-contrast image using, for example Photoshop®. This extracted object can be used in training a neural network system for extracting objects from input images using mattes, for instance, in determining compositional loss during the training of a matting neural network as described with reference to FIG. 3. It should be appreciated that even mattes from high-contrast produced by current methods can require manual touch-ups in order to remove any mistakes and to make them ideal training mattes.

At block 506, a synthetic composite image can be created using an extracted object, for example, the object extracted at block 504. A synthetic composite image can be created by placing an extracted foreground object onto a background image. Producing synthetic composite images allows for the creation of a large training dataset for training a robust neural network system that can handle fine details, such as hair or fur, complex images, where the foreground and background have highly similar patterns and/or colors, and/or all or most of the pixels in the image have foreground/background information. Additionally, such trimap could be described as having a number and/or percentage of pixels in the image and/or regions in the image that are unknown above a threshold level. For example, 90% of an input image contains alpha values that are unknown. Such a large dataset, for example, occurs when a training dataset uses 493 extracted foreground objects, where each can be placed onto up to 100 backgrounds, resulting in a training set of 49,300 training images.

At block 508, composite images, such as those created at block 506, can be used to train a neural network system. The neural network system can be comprised of a first neural network, such as a matting neural network, and a second neural network, such as a refining neural network. In addition, a matte, such as the matte generated at block 504, and an extracted object, such as the extracted object generated at block 504, can be used to train the neural network system. Composite images can be input into the neural network system to generate training mattes. These training mattes can be compared to reference mattes, such as the mattes created at block 504. Such a comparison can use predicted alpha values of the training mattes as compared to ground-truth alpha values of the reference mattes. This comparison can be used to determine errors in the neural network system that can be corrected to train a more accurate system. In addition, or alternatively, such training mattes can be used to extract an object from the training images; the extracted training object can then be placed on a training background. This training composite image can be compared to the reference object, extracted, for example, at block 504, which is placed on the same training background as the extracted training object. Errors between the training composite image and the reference composite image can be used to correct errors in the neural network system.

It should also be appreciated that actual images can be used for training, for example, a training matte can be generated from a real world photograph using any of: a separate depth camera, focus cues, color, and/or stereo. Additionally, a training matte can be automatically extracted from a set of images using either or both data inherent in the images and/or data collected in parallel with different or alternate sensing devices.

Figure 6:
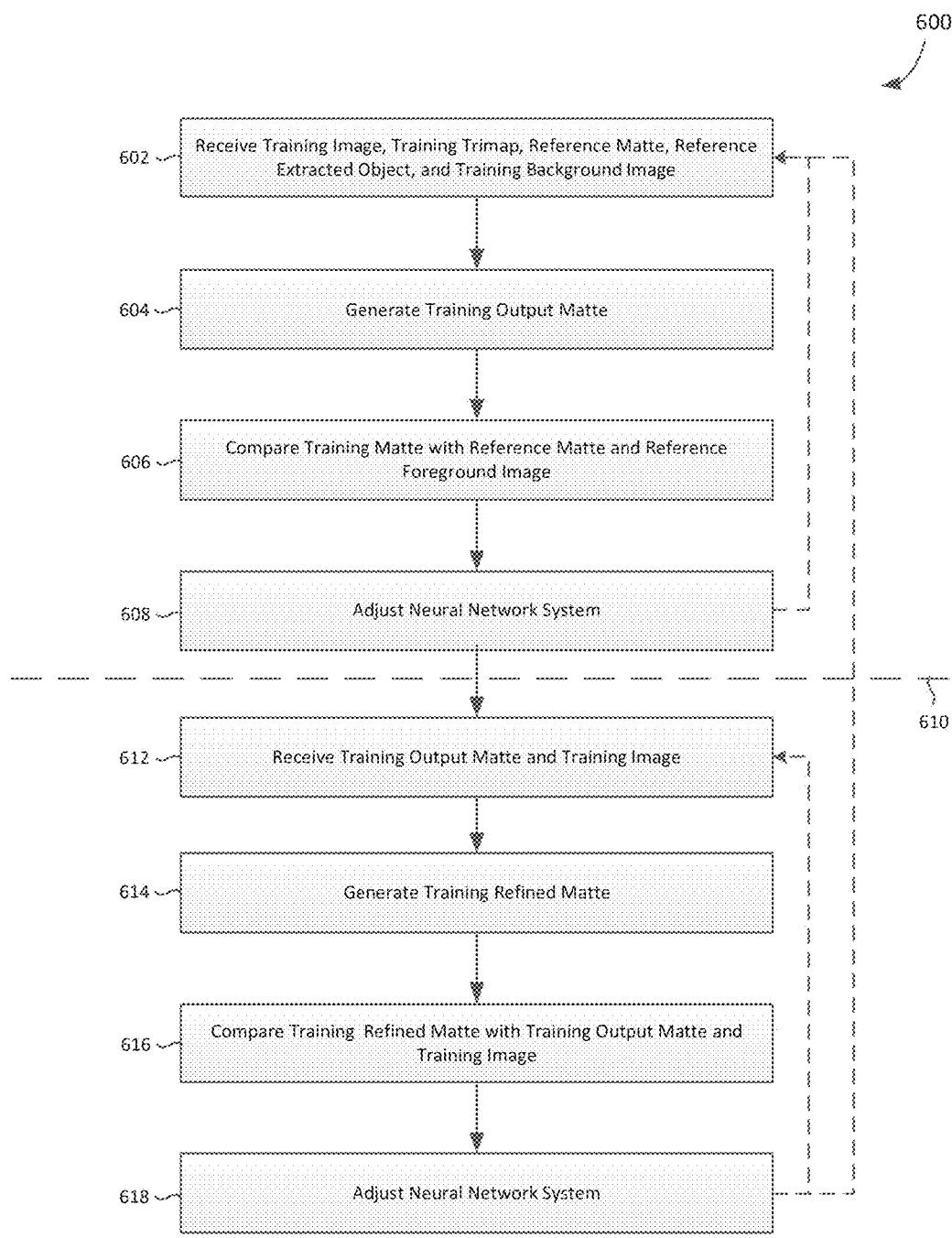
FIG. 6 illustrates an example method for training a neural network system to generate mattes from input images, in accordance with embodiments of the present invention.

FIG. 6 illustrates an example method 600 for training a neural network system to generate mattes from input images, in accordance with embodiments of the present invention. At blocks 604 through 618, method 600 includes steps for training a neural network system. The neural network system used in method 600 can be comprised of two neural networks as indicated by line 610; a first neural network, such as a matting neural network, that performs blocks 602 through 608 and a second neural network, such as a refining neural network, that performs blocks 612 through 618. However, it should be appreciated that method 600 could be performed using one neural network or more than two neural networks.

At block 602, training data can be received including: a training image, a training trimap, a reference matte, a reference extracted object, and a training background image. Such a training data can be received from, for example, training data 316 stored on data store 312 of FIG. 3 and/or from an image database stored in the cloud.

At block 604, a training matte can be generated for the received training image/trimap. This can be accomplished using a neural network system, specifically using a first neural network of the system, such as a matting neural network to predict alpha values comprising the training matte. At block 606, the training matte can be compared with the reference matte associated with the training image. This comparison includes determining pixel loss, or the difference between predicted alpha values of the training matte and ground-truth alpha values of the reference matte. At block 606, the training matte can be used to extract an object from the training composite image; the extracted training object can then be placed on a training background. This training composite image can be compared to the reference extracted object, which is placed on the same training background as the extracted training object. This comparison includes determining compositional loss.

These comparisons can be used at block 608 where the neural network system can be adjusted using the determined loss functions. Errors determined using loss functions are used to minimize loss in the neural network system by backwards propagation of such errors through the system. As indicated in FIG. 6, the foregoing blocks may be repeated any number of times to train the first neural network of the neural network system (e.g., using a different training image/trimap and associated reference matte, extracted object, and training background image for each iteration).

At block 612, a training matte and a training image can be received. Such a training matte can be generated by, for example, a first neural network, such as a matting neural network. The training image received is the same training image used by the first neural network to generate the training matte. The training image and training matte can be stored in training data 316 stored on data store 312 of FIG. 3, from a database stored in the cloud, and/or from the first neural network, as an output matte.

At block 614, a training refined matte can be generated from the training matte and training image using a neural network system. For example, a second neural network of a neural network system can be used to generate such a training refined matte, where the second neural network can be a refining neural network. At block 616, the training output refined matte can be compared with a reference matte. This comparison includes determining loss function such as pixel loss, or the difference between predicted alpha values of the training refined matte and ground-truth alpha values of the reference matte. Such comparisons can be used at block 618 where the neural network system can be adjusted using the determined loss functions. Errors determined using loss functions are used to minimize loss in the neural network system by backwards propagation of such errors through the system.

As indicated in FIG. 6, blocks 612 through 618 may be repeated any number of times to train the second neural network of the neural network system (e.g., using a different training matte/training image for each iteration). Alternatively, as indicated in FIG. 6, blocks 602 through 618 may be repeated any number of times to train the neural network system simultaneously (e.g., using a different training image/trimap and associated reference matte, extracted object, and training background image for each iteration to produce an output training matte that is used along with the training image to generate a refined matte).

Figure 7:
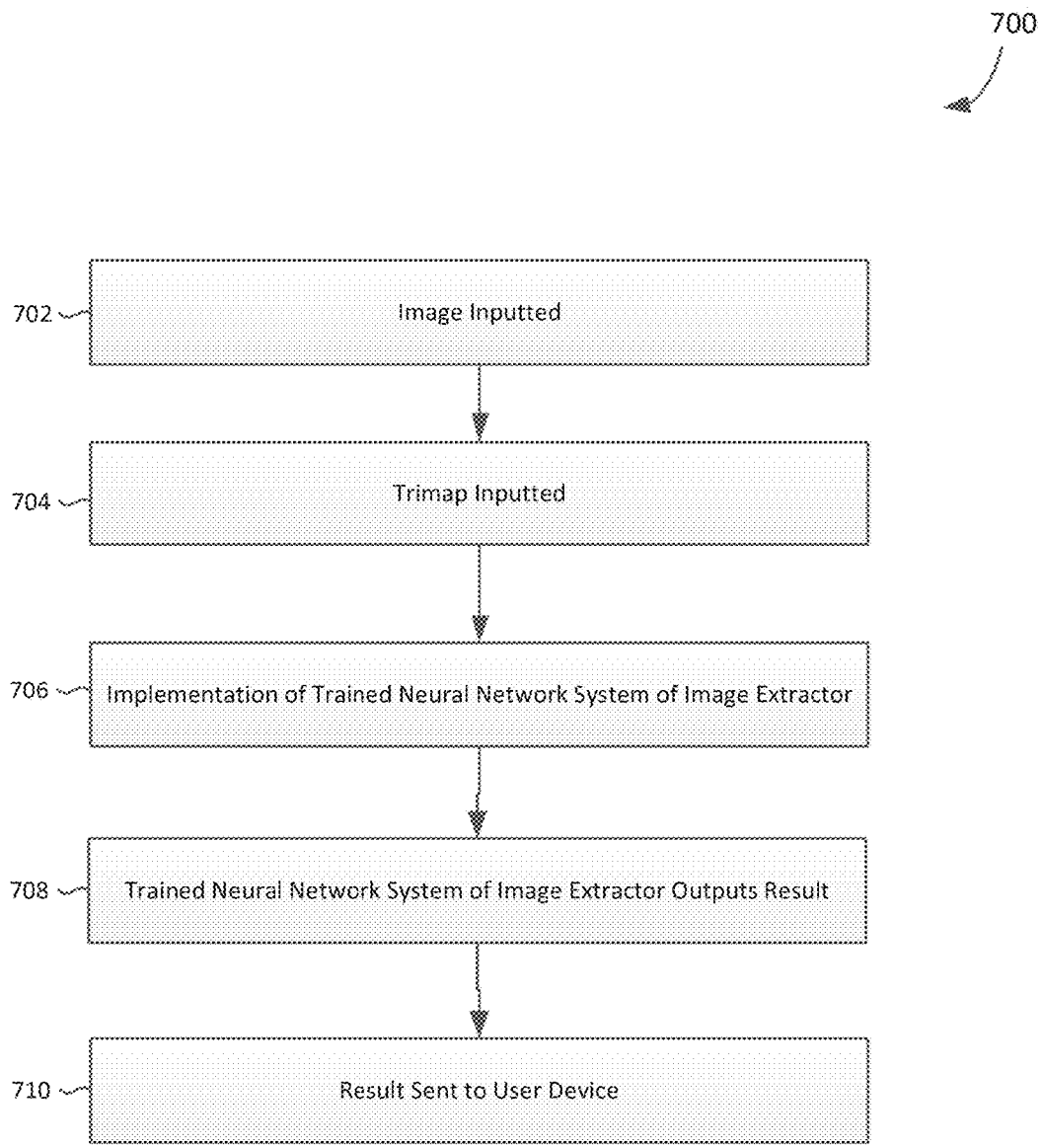
FIG. 7 illustrates an example method for generating mattes from input images for extracting objects from an input image, in accordance with embodiments of the present invention.

FIG. 7 illustrates an example method 700 for generating mattes from input images for extracting objects from the input image using alpha values of the generated mattes, in accordance with embodiments of the present invention. Method 700 can be performed, for example by object extractor 206 of FIG. 2 and/or object extractor 302 utilizing neural network system 314 of FIG. 3 upon completion of training the system.

At block 702, an image can be input. For example, a user can input an image into an object extractor, for example, object extractor 206 as described with reference to FIG. 2 and/or object extractor 302 as described with reference to FIG. 3. Such an object extractor can be employed using, for example, Photoshop®, a mobile application, and/or a camera application. The image can be input using a camera to take a picture or a user can input the image by inputting a link or URL to an image. Alternatively, a user could select an image from a group of images stored in a database, such as data store 312 of FIG. 3.

At block 704, a trimap can be input. The trimap marks regions of the input image that are pure foreground, pure background, and unknown (e.g. an unknown blend of foreground and background). For example, pure foreground can be designated as a white pixel, pure background can be designated as a black pixel, and pixels that are unknown, potentially comprised of both foreground and background information can be marked using grey. For example, a user can input a trimap by drawing on the input image. Alternatively, a user can create the trimap using binary selection to select the foreground/background for the input image. Such a binary selection can be made, for example, in Photoshop® by moving a slider that expands/contracts the band around the object. In addition, an algorithm can be used to create the trimap. Using such an algorithm could allow a trimap to be input without user intervention and/or interaction.

At block 706, the trained neural network system can be implemented to generate a matte for the input image that can be used to extract an object from the input image. The neural network system can have previously been trained in a manner as described in reference to method 600 in FIG. 6. As such, the neural network system can be comprised of a first neural network, such as a matting neural network, trained to generate mattes for input images and a second neural network, such as a refining neural network, trained to refine the mattes generated by the first neural network. Upon conclusion of the training process, the trained matting neural network and trained refining neural network can be used to generate mattes for input images. This trained neural network system can be used to generate mattes for input images used to extract objects from the input images. The matte neural network can be used to generate a matte for an input image and the refining neural network can be used to generate a refined matte for the input image. Such generated mattes and/or refined mattes can accurately extract objects because the neural network system has been trained to accurately predict alpha values for the pixels of the generated mattes and/or refined mattes.

At block 708, the neural network system outputs a result. Such a result can be a matte, such as matte 404 discussed with reference to FIG. 4. In addition, or alternatively, such a result can be a refined matte, such as refined matte 406. Such a result can also be the object extracted using the generated matte or the generated refined matte. At block 710, the result output by the neural network system can be sent to a user device. A user device can be a user device such as user device 202a through 202n as depicted in FIG. 2. In embodiments, this output can be manipulated and/or interacted with by the user, for example, by selecting a new background onto which to place the extracted object. Interaction with the extracted object can occur using techniques for placement on a new background including placement using a touch screen, a stylus, a mouse, and/or a track pad.

Figure 8:
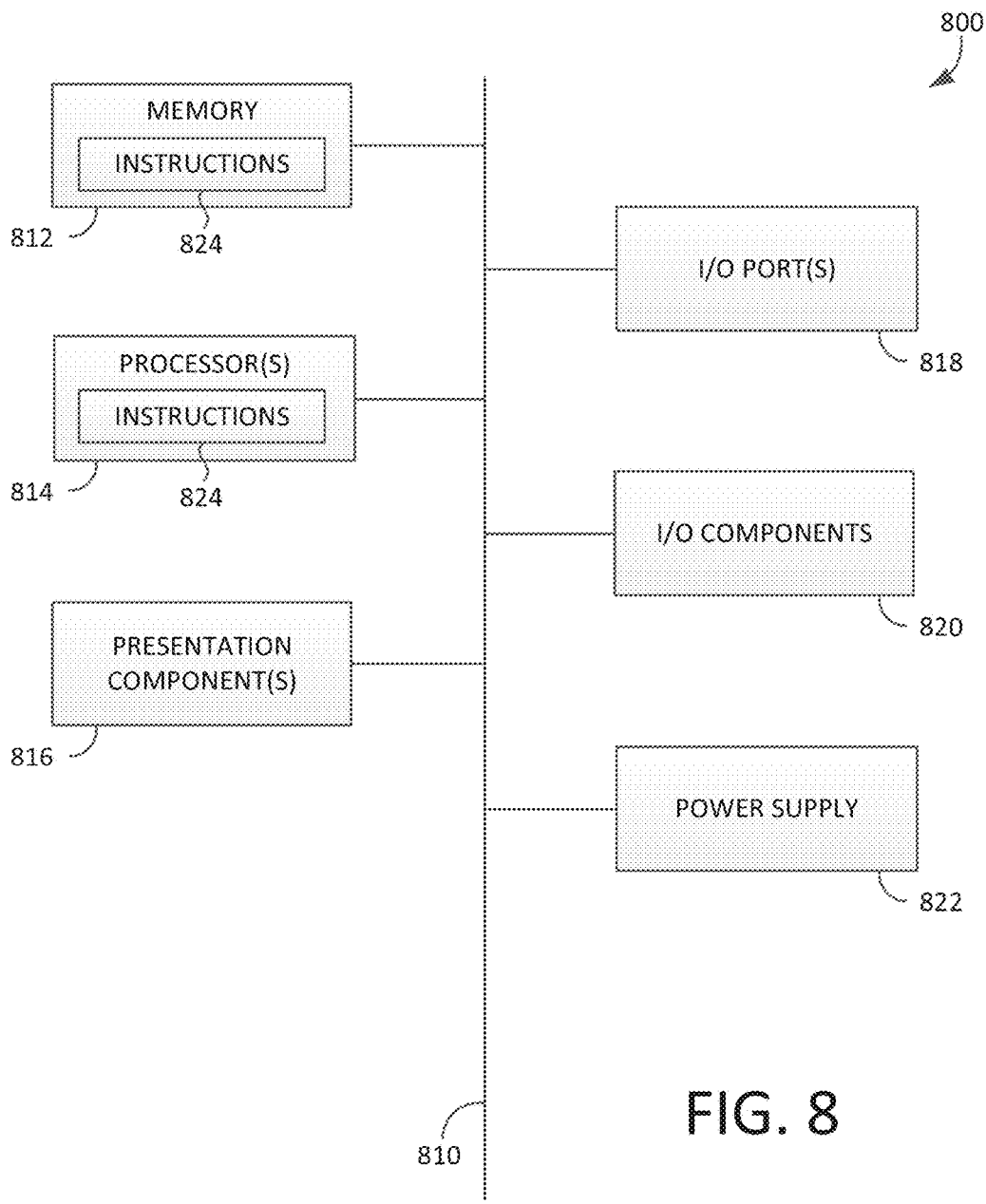
FIG. 8 is a block diagram of an example computing device in which embodiments of the present disclosure may be employed.

Having described embodiments of the present invention, FIG. 8 provides an example of a computing device in which embodiments of the present invention may be employed. Computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present invention. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 may be equipped with depth cameras, such as stereoscopic camera systems, infrared camera systems, RGB camera systems, and combinations of these, for gesture detection and recognition. Additionally, computing device 800 may be equipped with accelerometers or gyroscopes that enable detection of motion. The output of the accelerometers or gyroscopes may be provided to the display of computing device 800 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for training a neural network system to generate mattes for images, the method comprising:
    inputting, into a first neural network, a training image and trimap pair, the trimap indicating a blended region in which one or more pixels include an unknown combination of foreground and background colors;
    determining, by the first neural network, a percentage of foreground color for each of the one or more pixels in the blended region, the first neural network using color, structure, and texture information to determine percentages of foreground color in association with the one or more pixels;
    generating, by the first neural network, a training matte for the training image using the percentages of foreground color for each of the one or more pixels in the blended region;
    identifying, by the first neural network, error associated with the training matte using a loss function; and
    adjusting the first neural network based on the identified error associated with the training matte.

2. The computer-implemented method of claim 1, wherein the training image is a synthetic composite training image including a foreground object composited onto a background image, wherein the synthetic composite training image is generated by creating a matte for a high-contrast image to extract the foreground object from the high-contrast image for placement onto the background image.

3. The computer-implemented method of claim 1, wherein the loss function includes compositional loss that is determined based on a comparison of a reference composite image and a training composite image, the reference composite image comprising a reference foreground object extracted from the training image using a reference matte and a background image, and the training composite image comprising a foreground object extracted from the training image using the training matte and the background image.

4. The computer-implemented method of claim 1, wherein the loss function includes pixel loss based on a comparison of a reference matte to the training matte generated by the first neural network.

5. The computer-implemented method of claim 1, further comprising:
    inputting, into a second neural network, the training image and the training matte;
    determining, by the second neural network, a refined percentage of foreground color for each of the one or more pixels in the training image, the second neural network using edge information to determine the refined percentages of foreground color in association with the one or more pixels;
    generating, by the second neural network, a refined training matte for the training image using the refined percentage of foreground color for each of the one or more pixels in the training image;
    identifying, by the second neural network, error associated with the refined training matte using a second loss function; and
    adjusting the second neural network based on the identified error associated with the refined training matte.

6. The computer-implemented method of claim 5, wherein the second loss function includes pixel loss based on a comparison of a reference matte to the refined training matte generated by the second neural network.

7. The computer-implemented method of claim 1, further comprising:
    compiling a plurality of training mattes generated by the first neural network, wherein one of the plurality of training mattes is the training matte generated for the training image;
    inputting, into a second neural network, the compiled plurality of training mattes and a complete training image composed of a plurality of tiles, wherein one of the plurality of tiles is the training image;
    determining, by the second neural network, a refined percentage of foreground color for each of one or more pixels in the complete training image, the second neural network using edge information to determine the refined percentages of foreground color in association with the one or more pixels;
    generating, by the second neural network, a refined training matte for the complete training image using the refined percentage of foreground color for each of the one or more pixels in the complete training image;
    identifying, by the second neural network, error associated with the refined training matte using a second loss function; and
    adjusting the second neural network based on the identified error associated with the refined training matte.

8. The computer-implemented method of claim 7, wherein the second loss function includes pixel loss based on a comparison of a reference matte to the refined training matte generated by the second neural network.

9. The computer-implemented method of claim 1, further comprising:
performing data augmentation on the training images.

10. One or more non-transitory computer-readable media having a plurality of executable instructions embodied thereon, which, when executed by one or more processors, cause the one or more processors to perform a method for generating mattes for input images, the method comprising:
receiving an input image and trimap pair, the trimap indicating a blended region in which one or more pixels include an unknown combination of foreground and background colors;
determining a percentage of foreground color for each of the one or more pixels in the blended region via a neural network system that utilizes color, structure, and texture information to determine percentages of foreground color in association with the one or more pixels, wherein the neural network system comprises a first neural network trained to generate mattes based on adjusting for errors determined using color, structure, and texture information; and
generating, via the neural network system, a matte for the input image using the percentages of foreground color for each of the one or more pixels in the blended region.

11. The media of claim 10, wherein the input image is divided into tiles that are processed by the neural network to generate the matte for the input image.

12. The media of claim 10, the method further comprising:
receiving a user selection of a background image;
generating a composite image by placing an extracted object from the input image onto the background image, wherein the object is extracted using the generated matte.

13. The media of claim 10, wherein the neural network system comprises a trained neural network system being trained by:
inputting, into the first neural network, a training image and trimap pair;
determining, by the first neural network, a value of foreground color for pixels in a blended region of the training trimap, the first neural network using color, structure, and texture information to determine values of foreground color in association with the one or more pixels;
generating, by the first neural network, a training matte for the training image using the values of foreground color for the pixels in the blended region of the training trimap;
identifying, by the first neural network, error associated with the training matte using a loss function; and
adjusting the first neural network based on the identified error associated with the training matte.

14. The media of claim 13, wherein the trained neural network system is further trained by:
creating the training image by placing an extracted foreground object onto a background image, wherein the foreground object is extracted using a second matte for a high-contrast image.

15. The media of claim 13, wherein the loss function includes compositional loss determined based on a comparison of a reference composite image and a training composite image, the reference composite image comprising a background image and a reference foreground object extracted from the training image using a reference matte, and the training composite image comprising the background image and a foreground object extracted from the training image using the training matte.

16. The media of claim 13, wherein the trained neural network system is further trained by:
inputting, into a second neural network, the training image and the training matte;
determining, by the second neural network, a refined percentage of foreground color for pixels in the training image, the second neural network using edge information to determine the refined percentages of foreground color in association with the pixels;
generating, by the second neural network, a refined training matte for the training image using the refined percentages of foreground color;
identifying, by the second neural network, error associated with the refined training matte using a second loss function; and
adjusting the second neural network based on the identified error associated with the refined training matte.

17. A computing system comprising:
one or more processors;
means for training a neural network system, wherein the neural network system includes a first neural network trained to generate mattes from input image and trimap pairs and a second neural network trained to refine the mattes generated by the first neural network; and
means for generating a matte for an input image using the trained neural network system.

18. The system of claim 17, wherein the generated matte is used to extract a foreground object from the input image.

19. The system of claim 17, wherein the input image is separated into tiles processed by the trained neural network system to generate the matte for the input image.

20. The system of claim 17, wherein the first neural network is trained using compositional loss determined based on a comparison of a reference composite image and a training composite image, the reference composite image comprising a background image and a reference foreground object extracted from the input image using a reference matte, and the training composite image comprising the background image and a foreground object extracted from the input image using the training matte.

* * * * *

UNITED STATES PATENT AND TRADEMARK OFFICE
CERTIFICATE OF CORRECTION

PATENT NO. : 10,255,681 B2
APPLICATION NO. : 15/448541
DATED : April 9, 2019
INVENTOR(S) : Brian Lynn Price et al.

Page 1 of 1

It is certified that error appears in the above-identified patent and that said Letters Patent is hereby corrected as shown below:

In the Specification

Column 3, Line 38: Delete "$I_i=\alpha_i F_i+(1-\alpha 1)B_i$" and insert -- $I_i=\alpha_i F_i+(1-\alpha_i)B_i$ --, therefor.

Signed and Sealed this
Second Day of July, 2019

Andrei Iancu
*Director of the United States Patent and Trademark Office*